United States Patent [19]

Lohr

[11] Patent Number: 4,492,408
[45] Date of Patent: Jan. 8, 1985

[54] VEHICLE SEAT CONSTRUCTION AND METHOD OF MAKING THE SAME

[75] Inventor: Thomas E. Lohr, Harrison Township, Macomb County, Mich.

[73] Assignee: Allen Industries, Inc., Troy, Mich.

[21] Appl. No.: 340,681

[22] Filed: Jan. 19, 1982

[51] Int. Cl.³ .............................................. A47C 1/02
[52] U.S. Cl. .................... 297/344; 248/424; 248/429; 248/430; 297/311; 297/452
[58] Field of Search ...................... 248/424, 429, 430; 297/340, 311, 344, 452

[56] References Cited

U.S. PATENT DOCUMENTS

| 2,066,557 | 1/1937 | Cox | 248/429 |
| 2,858,877 | 11/1958 | Krause | 297/344 X |
| 3,259,354 | 7/1966 | Dall | 248/429 |
| 3,583,665 | 6/1971 | Lohr | 248/395 |
| 4,381,096 | 4/1983 | Roper | 248/429 |

FOREIGN PATENT DOCUMENTS 0099827 8/1981 Japan ................. 297/351

Primary Examiner—James T. McCall
Attorney, Agent, or Firm—Joseph V. Tassone

[57] ABSTRACT

A longitudinally adjustable vehicle seat construction and method of making the same are provided, the seat construction comprising a lower structural seat frame unit, a seat cushion unit supported by the lower seat frame unit, and an upper slide unit carried by the construction for sliding longitudinally on a fixed lower slide unit carried by a vehicle to thereby permit longitudinal adjustment of the seat construction in the vehicle, the upper slide unit comprising a structural part of the lower structural seat frame unit.

7 Claims, 13 Drawing Figures

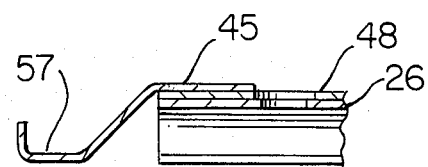
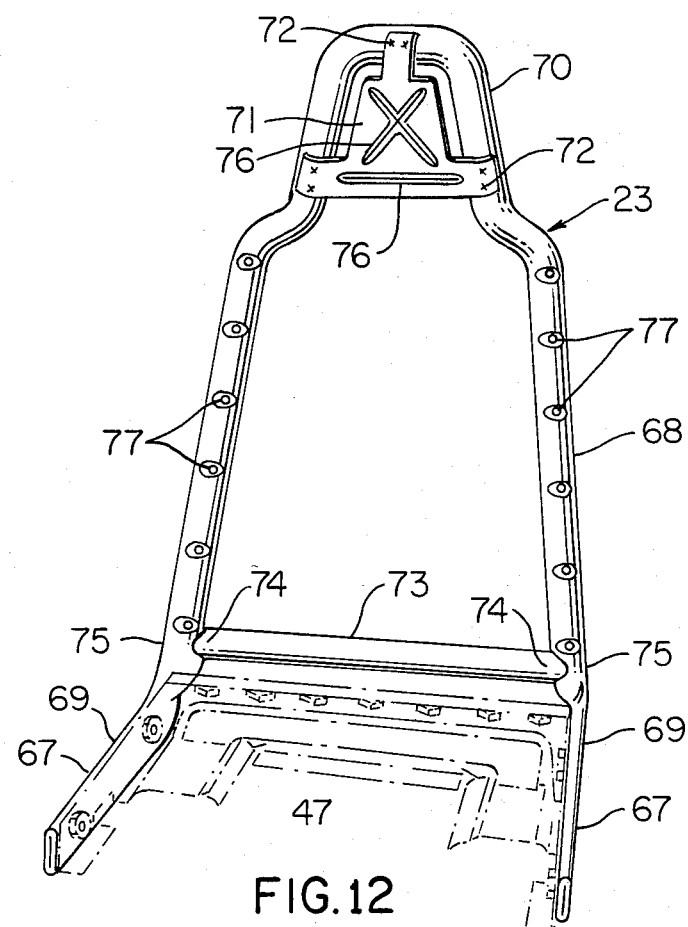
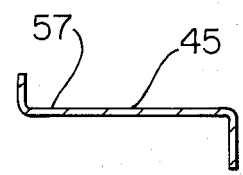
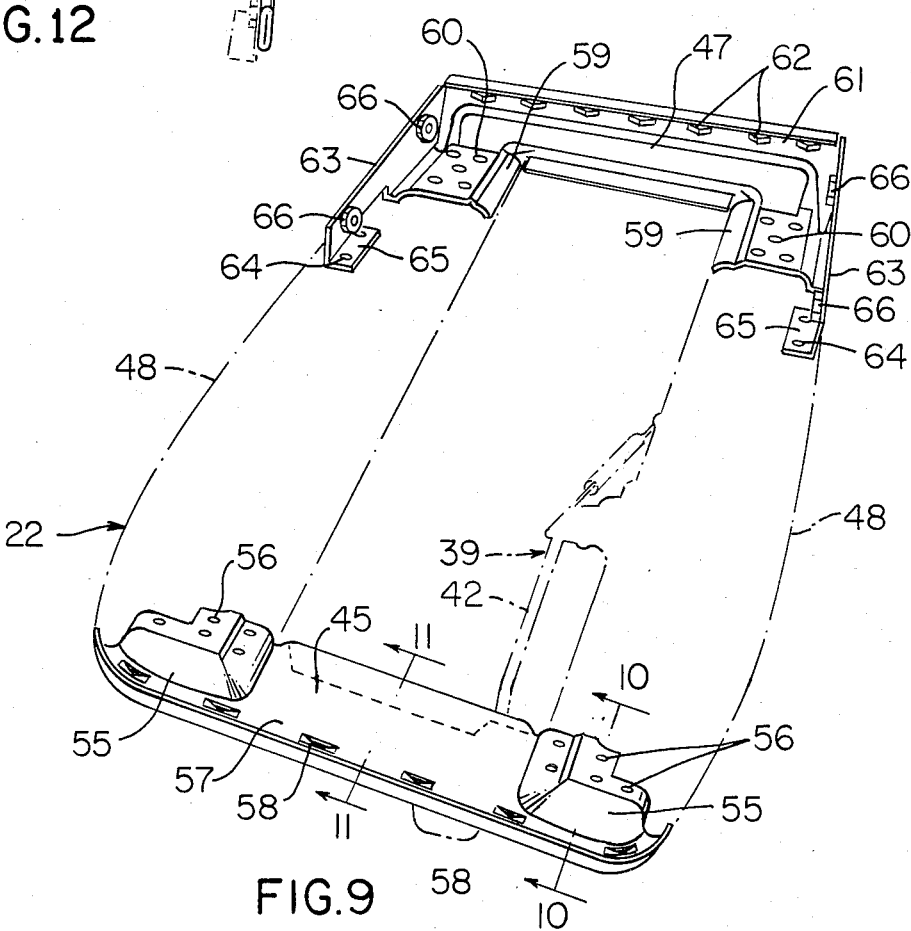

VEHICLE SEAT CONSTRUCTION AND METHOD OF MAKING THE SAME

BACKGROUND OF THE INVENTION

1. Field of the Invention

This invention relates to an improved seat construction for a transportation vehicle or the like as well as to a method of making such a seat construction.

2. Prior Art Statement

It is known in the art to provide a longitudinally adjustable vehicle seat construction comprising a lower structural seat frame means, a seat cushion means supported by the lower seat frame means, and upper slide means carried by the construction for sliding longitudinally on fixed lower slide means carried by the vehicle to thereby permit longitudinal adjustment of the seat construction in the vehicle.

For example, see the following U.S. patent:

(1) U.S. Pat. No. 3,583,665—Lohr

It appears that the upper slide means 32 that is carried by the seat construction 24 does not form a structural part of the lower structural seat frame means as the same is merely fastened thereto by fastening means 44, the upper slide means 32 sliding generally longitudinally on the lower slide means 34 which is fixed to a vehicle floor.

SUMMARY OF THE INVENTION

However, see the following U.S. Letters Patent wherein it appears that the slide members of the seat construction form part of the structural frame means thereof.

(2) U.S. Pat. No. 3,259,354—Dall

The patent to Dall states in column 2, lines 9-11 "Carriage 13 is generally tubular and split and preferably forms an integral part of the frame of the seat 10."

It is one feature of this invention to provide an improved longitudinally adjustable vehicle seat construction.

In particular, it was found according to the teachings of this invention that prior known longitudinally adjustable vehicle seat constructions each had the lower structural seat frame means subsequently secured to an upper slide means of a seat adjustment unit wherein the upper slide means was adapted for sliding longitudinally on a fixed lower slide means carried by a vehicle or the like to thereby permit longitudinal adjustment of the seat construction in the vehicle.

Such prior known seat adjustment arrangements each required the slide sub-assembly or unit to take full specified loads with the seat frame assembly or unit also taking full loads since it is assumed that under impact conditions, the slide assembly will remain fixed to the vehicle floor thereby transmitting all loads to the seat frame. However, this prior known seat construction arrangement requires additional space since both the slide unit and the seat construction are designed as separate sub-assemblies with attaching means being provided to combine the units.

It was found according to the teachings of this invention that by combining the slide unit with the seat frame unit, the seat construction could be designed to take the loads as a single combined assembly while providing exceptional leg room improvement for the rear seat occupants.

For example, one embodiment of this invention provides a longitudinally adjustable vehicle seat construction comprising a lower structural substantially rectangular seat frame means, a seat cushion means supported by the lower seat frame means, and upper slide means carried by the construction for sliding longitudinally on fixed lower slide means carried by a vehicle to thereby permit longitudinal adjustment of the seat construction in the vehicle, the upper slide means comprising a pair of spaced apart substantially parallel slide tracks that form a structural part of the lower structural seat frame means. Each slide track has a generally C-shaped cross-sectional configuration with a bight that faces the fixed lower slide means so as to receive the fixed lower slide means therein and is provided with a front end and a rear end. The seat frame means comprises a front structural portion that has opposed ends respectively secured to the front ends of the slide tracks and extends in a forward direction beyond the front ends. The seat frame means also comprises a rear structural portion that has opposed ends respectively secured to the rear ends of the slide tracks and extends in a rearward direction beyond the rear ends whereby the slide tracks define side portions of the seat frame means.

Accordingly, it is an object of this invention to provide an improved longitudinally adjustable vehicle seat construction having one or more of the novel features of this invention as set forth above or hereinafter shown or described.

Another object of this invention is to provide a method of making such a seat construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 9 is a view similar to FIG. 7 and illustrates the front bar and rear bar for completing the lower frame means of the seat construction of FIG. 1.

FIG. 10 is an enlarged fragmentary cross-sectional view taken on line 10—10 of FIG. 9.

FIG. 11 is an enlarged cross-sectional view taken on line 11—11 of FIG. 9.

FIG. 12 is a perspective view of the upper back frame means for the seat construction of FIG. 1.

DESCRIPTION OF THE PREFERRED EMBODIMENT

Figure 1:
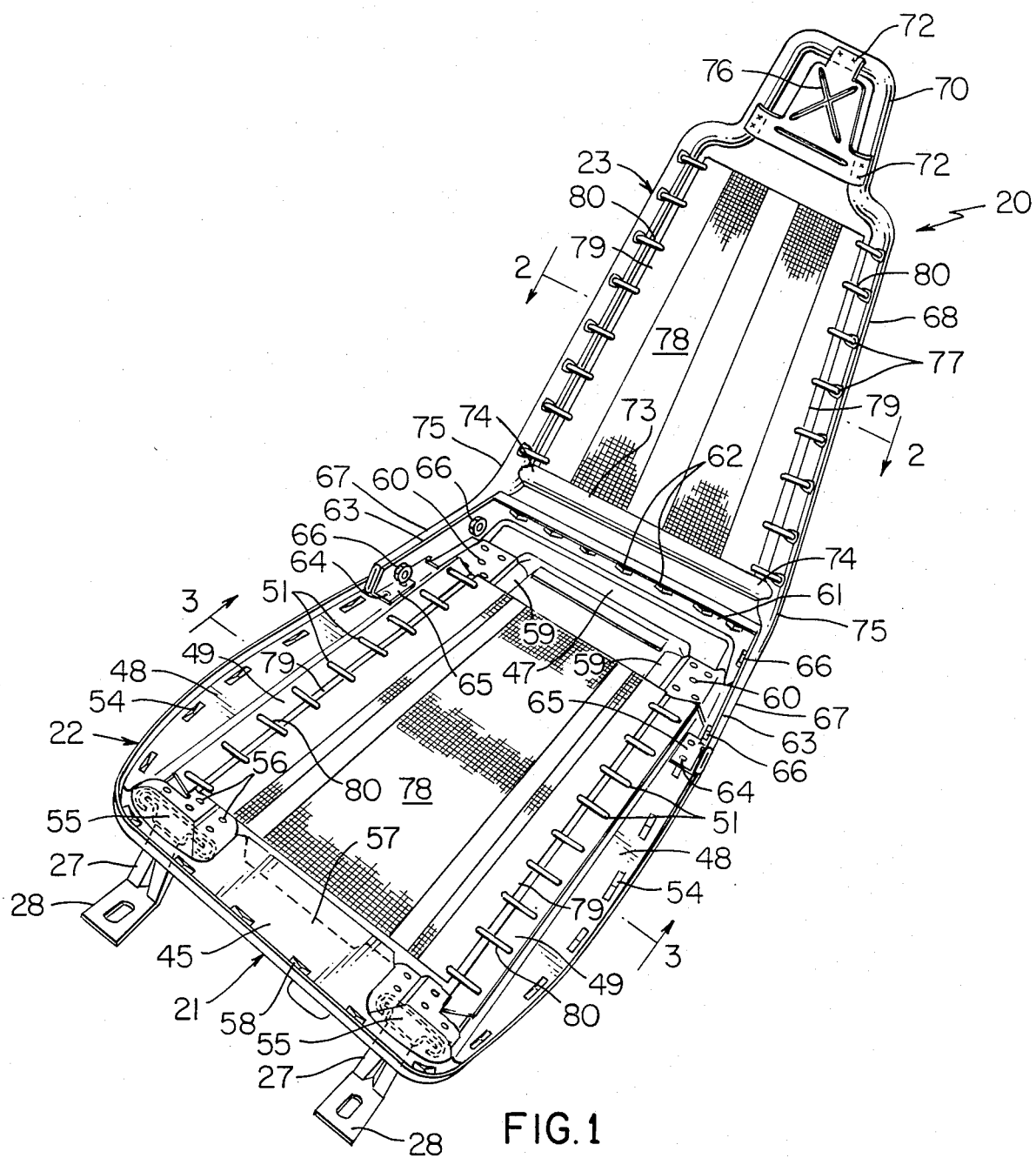
FIG. 1 is a perspective view of the improved longitudinally adjustable vehicle seat construction of this invention with the seat and back cushion means and trim thereof removed.

While the various features of this invention are hereinafter illustrated and described as providing a seat construction for an automobile, it is to be understood that the various features of this invention can be utilized singly or in various combinations thereof to provide a seat construction for other vehicles or apparatus as desired.

Therefore, this invention is not to be limited to only the embodiment illustrated in the drawings, because the drawings are merely utilized to illustrate one of the wide varieties of uses of this invention.

Figure 2:
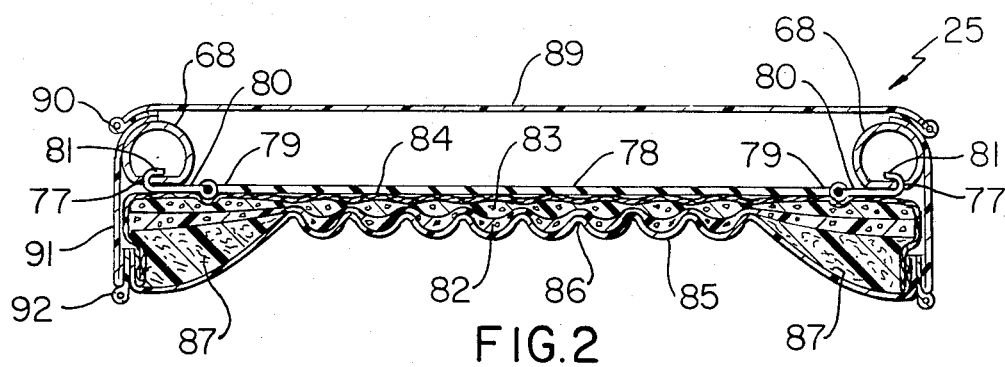
FIG. 2 is an enlarged cross-sectional view taken on line 2—2 of FIG. 1 and illustrates the seat construction of FIG. 1 with the back seat cushion means and trim included.
Figure 3:
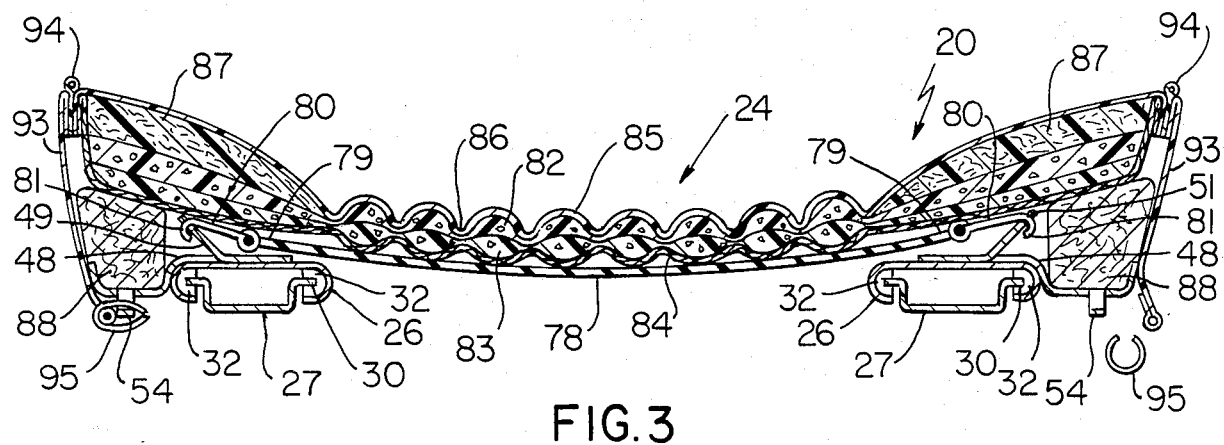
FIG. 3 is an enlarged cross-sectional view taken on line 3—3 of FIG. 1 and illustrates the seat construction with the seat cushion means and trim included.

Referring now to FIGS. 1, 2 and 3, the improved seat construction of this invention is generally indicated by the reference numeral 20 and comprises a structural seat frame means 21 having a lower structural seat frame means 22 and an upper back seat frame means 23 respectively supporting seat cushion means 24 and back cushion means 25 respectively as illustrated in FIGS. 3 and 2.

The lower structural seat frame means 22, as will be apparent hereinafter, includes a pair of upper slide track means 26 respectively adapted to slide on a pair of lower slide track means 27 adapted to be fixed to a floor of a vehicle (not shown) in the spaced parallel relation illustrated in FIG. 4 whereby the seat construction 20 is adapted to be longitudinally adjusted in the vehicle for purposes well known in the art.

It is to be understood that the various parts of the seat construction 20 of this invention as hereinafter set forth can be formed of any suitable material and in any suitable manner whereby the examples of the materials subsequently set forth in this specification are merely for purpose of illustration and not for the purpose of providing limitations on this invention.

Figure 5:
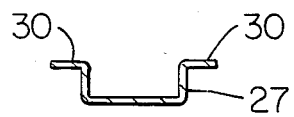
FIG. 5 is an enlarged cross-sectional view taken on line 5—5 of FIG. 4.
Figure 4:
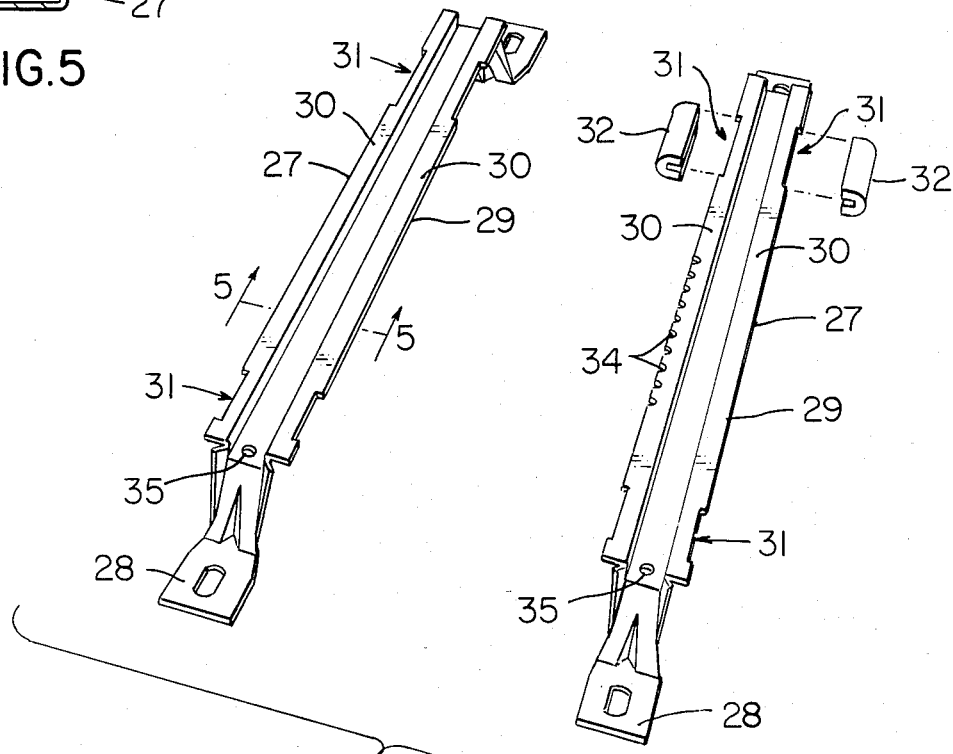
FIG. 4 is an exploded perspective view illustrating the lower slide tracks for the seat construction of FIG. 1.

Each lower slide track means 27 comprises a one-piece metal structure having formed ends 28 for bolting or otherwise fastening to the floor of the vehicle so that a substantially straight medial portion 29 thereof is disposed in spaced parallel relation above the floor and has a generally inverted hat-shaped cross-sectional configuration as illustrated in FIG. 5 defined by outwardly directed spaced parallel side flanges 30 that are respectively notched at 31 to receive slides 32 that have bights 33 for slipping on to the respective flanges 30 at their notches 31 as illustrated in FIGS. 3 and 4, two pairs of slides 32 being provided for each lower slide track means 27. Each slide track means 27 can comprise 0.093 of an inch thick S.A.E. No. 1020 C.R.S. (cold rolled steel) and each slide 32 can comprise a glass filled nylon member.

One flange 30 on the outboard or right track 27 illustrated in FIG. 4 is provided with a plurality of spaced locking notches 34 for locking the seat construction 20 in its fore and aft longitudinal adjusted position in a manner well known in the art and as hereinafter described, the length of the notches 34 being selected to permit a certain amount of seat travel, such as 4.75 inches.

Suitable holes 35 can be provided in the tracks 27 for attaching seat adjustment assist spring means (not shown) in a manner well known in the art for assisting the longitudinal adjustment of the seat construction 20 on the lower tracks 27 as will be apparent hereinafter.

If desired, the tracks 27 can be painted, such as with black paint or the like.

The upper slide tracks 26 that form part of the structural lower frame means 22 of the frame means 21 of the seat construction 20 each has a substantially C-shaped cross-sectional configuration defined by a flat upper portion 36 and a pair of inwardly turned curved end sections 37 that define a bight 38 therebetween for receiving the respective lower slide track 27 therein with the arcuate slide members 32 being received in sliding engagement inside the curved end sections 37 as illustrated in FIG. 3 to permit the seat construction 20 to slide on the lower tracks 27 for fore and aft longitudinal seat adjustment purposes. Each upper slide track means 26 can comprise 0.062 of an inch thick S.A.E. No. 1020 C.R.S. that can be zinc plated after all of the welding operations subsequently set forth have been completed thereon.

Figure 6:
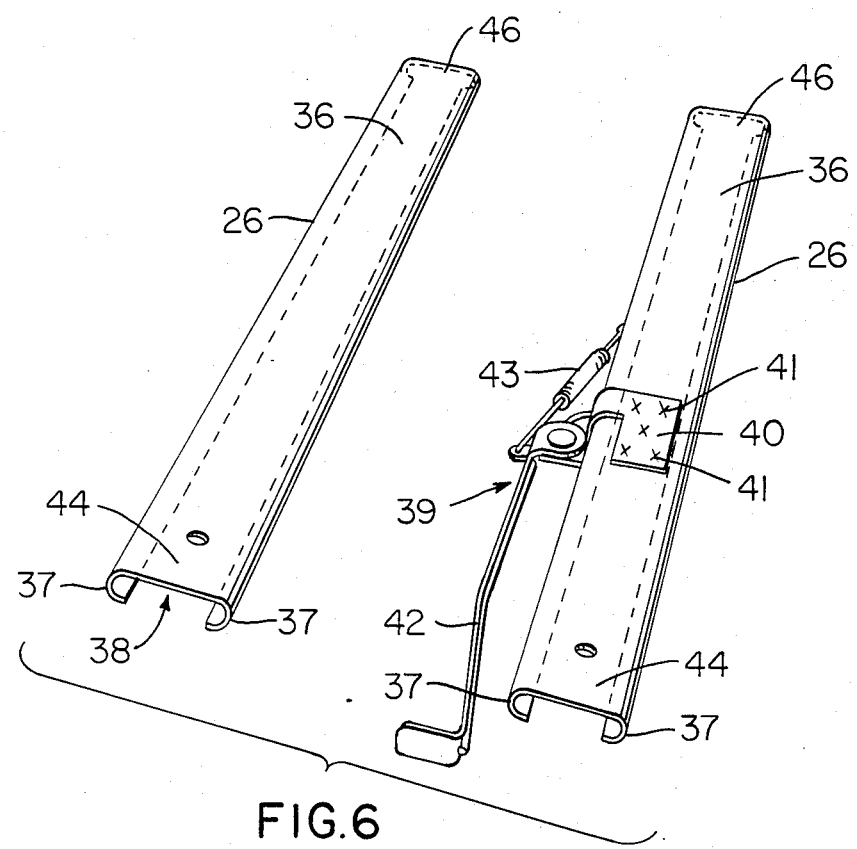
FIG. 6 is a perspective view illustrating the upper slide tracks of the seat construction of FIG. 1.

For example, a locking lever arrangement generally indicated by the reference numeral 39 in FIG. 6 is adapted to have a plate portion 40 thereof projection welded to the flat portion 36 of the outboard slide track means 26 at points 41 as illustrated so that a pivotally mounted locking handle 42 can cooperate with the locking notches 34 in its respective lower slide track means 27 in a manner conventional in the art to lock the slide track 26 thereto and, thus, the seat construction 20 in the desired longitudinal position on the lower slide track means 27 upon the releasing of the handle 42 which moves to its locking position under the force of a lock spring 43 in a manner well known in the art.

As previously stated, the upper slide track means 26 of this invention form part of the lower structural frame means 22 of the frame means 21 of the seat construction 20 and the slide track means 26 comprise side portions thereof that are disposed in the spaced apart parallel relation illustrated in the drawings and respectively have the front ends 44 thereof joined together by a front portion or bar 45, FIG. 9, and respectively have the rear portions 46 thereof joined together by a rear portion or bar 47, FIG. 9, in a manner hereinafter set forth.

Figure 8:
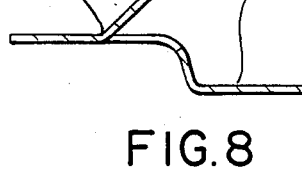
FIG. 8 is an enlarged cross-sectional view taken on line 8—8 of FIG. 7.
Figure 7:
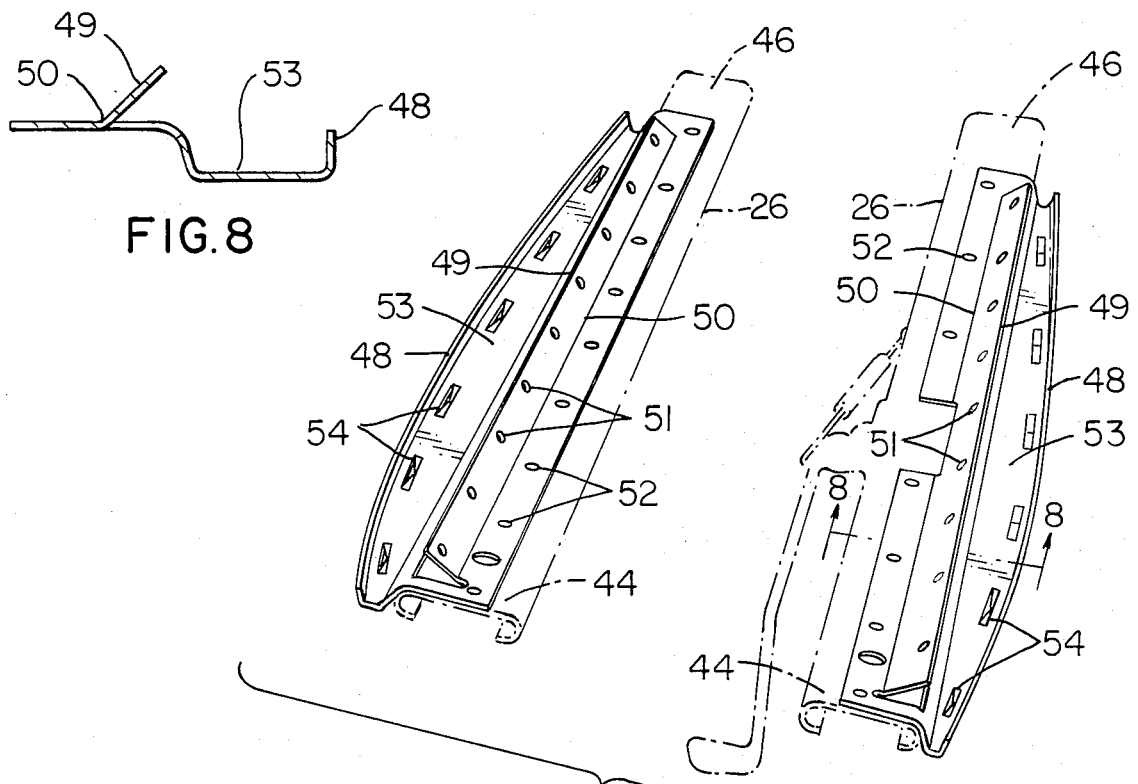
FIG. 7 is a view similar to FIG. 6 and illustrates the side panels that are secured to the upper slide tracks of FIG. 6.

A pair of light gauge side panels 48 are respectively secured to the flat portions 36 of the slide track means 26 and each respectively comprises a one-piece structure having a medial flange 49 carved therefrom and bent upwardly relative to a hinge line 50 to provide a series of attaching holes 51 for attaching a portion of the seat construction 24 thereto in a manner hereinafter set forth, each side panel 48 having the cross-sectional configuration illustrated in FIG. 8 and being adapted to comprise a light gauge metal sheet, such as 0.020 of an inch thick S.A.E. 1010 C.R.S. that can be projection welded to the flat portions 36 of the slide tracks 26 as indicated by the welds 52 in FIG. 7.

The outwardly shaping side trim portions 53 of the side panels 48 have lances 54 formed therefrom to provide so-called "hog-ring lances" for attaching the side trim of the seat cushion 24 in a manner hereinafter set forth and as well known in the art.

As illustrated in FIG. 9, the front portion or bar 45 has a pair of shaped end portions 55 adapted to be projection welded at 56 to the respective ends 44 of the upper slide track means 26, the front portion 45 having the cross-sectional configurations as illustrated in FIGS. 10 and 11 to define a front trim portion 57 having hog-ring lances 58 similar to the hog-ring lances 54 previously described.

Similarly, the rear portion or bar 47 has end portions 59 adapted to be respectively projection welded at 60 to the end portions 46 of the upper slide track means 26 and has a rear portion 61 provided with hog-ring lances 62.

In addition, the rear portion or bar 47 has upstanding flanges 63 projection welded to the respective upper slide track means 26 at 64 on plate means 65 thereof to define fastening means for the upper frame means 23. For example, a pair of nuts 66 can be welded to each flange 63 so as to provide means for bolting side flanges 67 of the upper frame means 23 thereto as illustrated in FIGS. 1 and 13.

The front bar or portion 45 and rear bar or portion 47 can each comprise 0.047 of an inch thick S.A.E. No. 1010 C.R.S.

Figure 13:
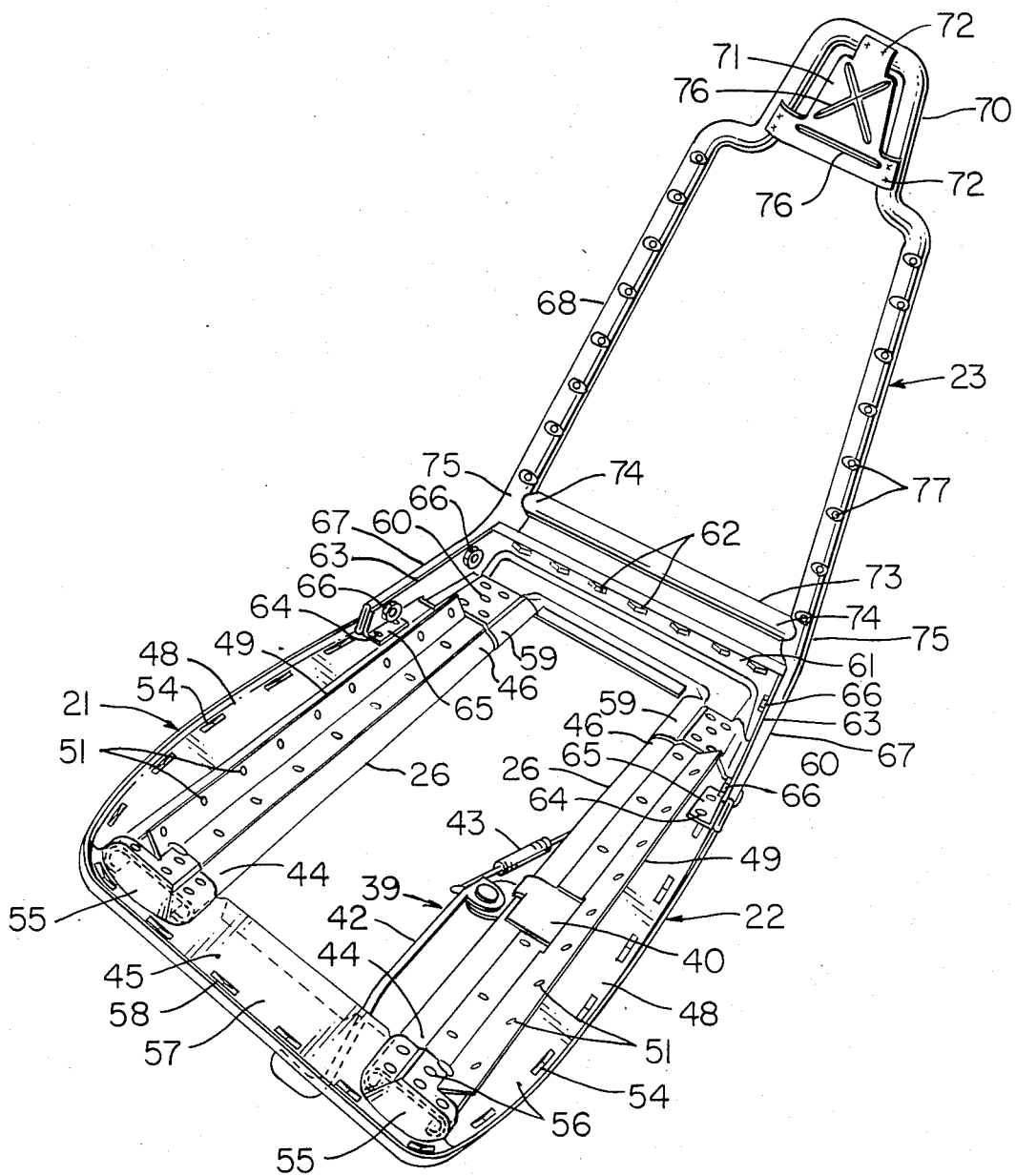
FIG. 13 is a perspective view illustrating the upper frame means of FIG. 12 secured to the lower frame means of FIG. 9 to complete the frame means of the seat construction of FIG. 1.

Therefore, it can be seen that the resulting lower structural seat frame means 22 of the frame means 21 of the seat construction 20 comprises a generally rectangular frame means formed from the pair of slide track means 26 being secured together in spaced apart relation by the front and rear portions 45 and 47 as illustrated in FIG. 13.

The upper back frame means 23 comprises a one-piece tube 68 having the opposed ends 69 thereof flattened to form the flanges 67 to be bolted to the side flanges 63 of the rear portion 47 of the lower seat frame means 23 by suitable bolts (not shown) as illustrated in FIG. 13. The tubing 68 is bent in such a manner to define a headrest portion 70 that has a head panel 71 projection welded thereto at 72.

In addition, a reinforcing tubular member 73 has its opposed ends 74 welded to intermediate portions 75 of the tubing 68 to provide structural strength to the upper back frame means 23.

The tubing 68 of the upper back frame means 23 is provided with a plurality of depressed holes 77 for attaching part of the back cushion means 25 thereto as will be apparent hereinafter.

The tubing 68 can comprise 1.125 inch O.D. with a 0.035 of an inch wall thickness electrically welded steel tubing, the reinforcing tubing 73 being of the same material while the head plate 71 can comprise 0.05 gauge H.R. steel that is provided with stiffening ribs 76 as illustrated.

If desired, the entire back frame means 23 can be painted, such as with a high luster black enamel or the like.

Thus, once the back frame means 23 has been bolted to the lower frame means 22 as illustrated in FIG. 13, the completed frame means 21 provides the entire structural strength for the resulting seat construction 20 that is adapted to be disposed on the lower track means 27 to slide thereon to the desired longitudinal position as illustrated in FIGS. 1 and 3 and as previously described.

While the seat cushion means 24 and back cushion means 25 can comprise any suitable structure, the embodiment of the seat cushion means 24 and back cushion means 25 of the seat construction 20 of this invention will now be described.

As illustrated in FIGS. 1-3, the seat cushion means 24 and back cushion means 25 each includes a generally flexible diaphragm spring means 78 of a blatter type having its side edges 79 carrying hooks 80 that have the hooked ends 81 thereof respectively hooked into the attaching openings 51 in the side panels 48 or openings 77 in the back tubing 68 as illustrated in FIG. 1 to span the space between the slide track means 26 or tubing 68 to provide a spring means for the seat cushion means 24 or back cushion means 25 in a manner well known in the art. For example, such diaphragm means 78 can comprise a rubber-like diaphragm which is known in the art as a "Pirelli Diaphragm".

The cushion means of the seat cushion means 24 and back cushion means 25 each consists of two layers of sheeting foam 82 and 83, a layer of body cloth 84 on the under surface thereof with a vinyl, padded material or leather seating material 85 on the opposite side of the composite, the composite being bonded together at intermediate portions 86 in the manner fully set forth in the U.S. Pat. No. 3,256,131 to Koch et al., whereby this patent is being incorporated into this disclosure by this reference thereto.

The layers 82 and 83 can comprise sheet urethane foam and suitable filler urethane foam pads 87 can be utilized to fill out the side portions of the seat and back cushion means 24 and 25 and in addition resin bonded fiber support pads 88 can be provided at the opposed side edges of the seat adjacent the side trim panels 48 and the side edges of the seat cushion 24 as illustrated.

In order to finish off the seat construction, an envelope type trim cover 89, FIG. 2, can be utilized for the back frame means 23 together with the conventional welting 90 and cut and sew side panels 91 and welting 92 therefor.

Similarly, the seat cushion means 24 can have the cut and sew side panel means 93 and welting 94 together with the hog-rings 95 attaching the side panel means 93 to the hog-ring lances 54 of the side panel 48 and the hog-ring lances 58 and 62 of the front and rear bars 45 and 47 in a manner well known in the art.

Therefore, it can be seen that by utilizing the diaphragms 78 and cushion means 24 and 25 in the manner previously described, the back and seat cushion means 25 and 24 are provided with far less thickness than normal so as to provide a relatively light-weight, thin profile and low cost bucket type seat arrangement that is adapted to be longitudinally adjusted on the lower slide track means 27 in the manner previously described with the upper slide track means 26 actually forming part of the lower structural seat frame means in the manner previously described.

Therefore, it can be seen that it is a relatively simple method of this invention to make the seat construction 20 previously described and to mount the same on the lower slide track means 27 when the lower slide track means 27 has been fastened to a floor of a vehicle or the like to permit the seat construction 20 to be longitudinally adjusted fore and aft through releasing the locking handle means 42 and thereafter applying the locking handle means 42 to hold the seat construction 20 in its adjusted position in a manner well known in the art.

Thus, it can be seen that this invention not only provides an improved longitudinally adjustable vehicle seat construction, but also this invention provides an improved method for making such a seat construction or the like.

While the form and method of this invention now preferred have been illustrated and described as required by the Patent Statute, it is to be understood that other forms and method steps can be utilized and still fall within the scope of the appended claims.

What is claimed is:

1. In a longitudinally adjustable vehicle seat construction comprising a lower structural substantially rectangular seat frame means, a seat cushion means supported by said lower seat frame means, and upper slide means carried by said construction for sliding longitudinally on fixed lower slide means carried by a vehicle to thereby permit longitudinal adjustment of said seat construction in said vehicle, said upper slide means comprising a pair of spaced apart substantially parallel slide tracks that form a structural part of said lower structural seat frame means, each said slide track having a generally C-shaped cross-sectional configuration with a bight that faces said fixed lower slide means so as to receive said fixed lower slide means therein and being provided with a front end and a rear end, the improvement wherein said seat frame means comprises a front structural portion that has opposed ends respectively secured to said front ends of said slide tracks and extends in a forward direction beyond said front ends, said seat frame means comprising a rear structural portion that has opposed ends respectively secured to said rear ends of said slide tracks and extending in a rearward direction beyond said rear ends whereby said slide tracks define side portions of said seat frame means.

2. A seat construction as set forth in claim 1 and including an upper back frame means carried by said lower frame means, and back cushion means supported by said upper back frame means.

3. A seat construction as set forth in claim 2 wherein said upper back frame means is carried by said slide tracks.

4. A seat construction as set forth in claim 1 and including a pair of side panel means respectively carried by said slide tracks.

5. A seat construction as set forth in claim 4 wherein said seat cushion means includes a spring means spanning the space between said slide tracks and being interconnected to said side panel means.

6. A seat construction as set forth in claim 5 wherein each said side panel means has an integral flange bent therefrom, said spring means being attached to said flanges of said side panel means.

7. A seat construction as set forth in claim 6 wherein each side panel means has a front end secured between said front end of its respective slide track and its respective end of said front portion and has a rear end secured between said rear end of its respective slide track and its respective end of said rear portion.

* * * * *